Feb. 27, 1934.    J. BUHOLZER    1,949,351
CAMERA
Filed Jan. 22, 1930
Fig. 1.    Fig. 2.    Fig. 3.
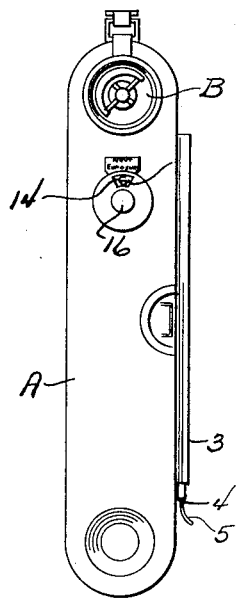 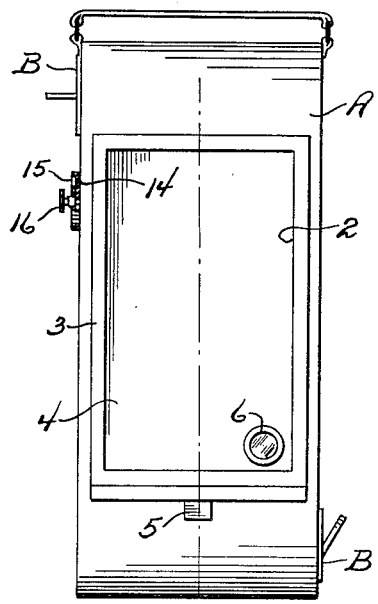 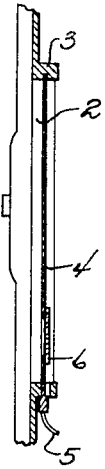
Fig. 4.    Fig. 6.
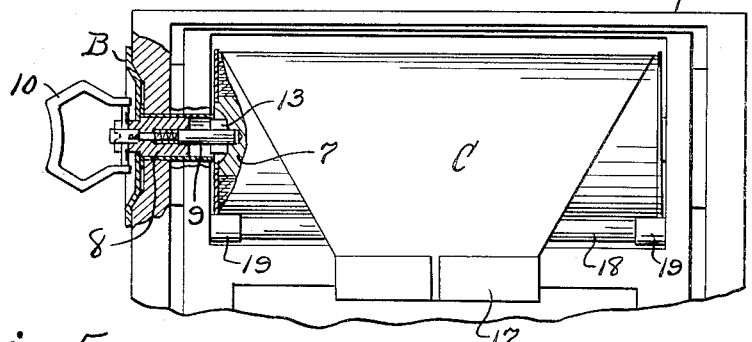 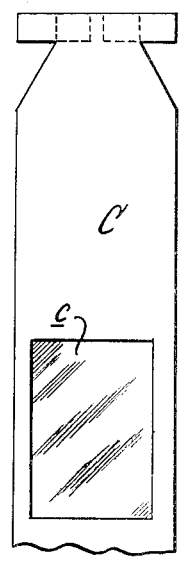
Fig. 5.
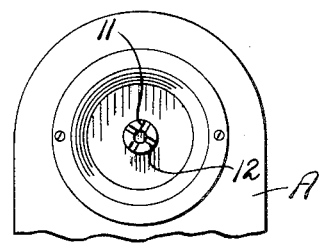
Joseph Buholzer
INVENTOR
BY Victor J. Evans
ATTORNEY
WITNESS Patented Feb. 27, 1934

1,949,351

UNITED STATES PATENT OFFICE 1,949,351

CAMERA

Joseph Buholzer, Nueva Gerona, Isla de Pinos, Cuba, assignor of one-fifth to Paul John Huttenlocher, Nueva Gerona, Isla de Pinos, Cuba Application January 22, 1930. Serial No. 422,637

1 Claim. (Cl. 95—32)

This invention relates to improvements in film cameras, the general object of the invention being to provide means whereby the camera can be focussed through an opening in the back thereof whenever desired and while the film is in the camera.

Another object of the invention is to provide each roll with a transparent part at its front end which acts as a ground glass when brought opposite the opening, with means whereby the roll can be positioned after each exposure or whenever desired to bring its transparent part opposite the opening.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an edge view of the improved camera.

Figure 2 is a rear view thereof.

Figure 3 is a section on line 3—3 of Figure 2.

Figure 4 is a fragmentary view with a part of the camera removed and parts in section, showing the handle member for turning one of the rolls.

Figure 5 is a detail edge view showing the notches in the handle member for receiving a part of the handle.

Figure 6 is a view of the film strip backing with the transparent part therein.

This case is a companion to an application Serial No. 422,636 filed concurrently herewith, which eventuated April 12, 1932 in Letters Patent 1,854,102 and part of which is shown in the present application.

As shown in these views, the back of the film camera A is formed with an opening 2 which is surrounded by a flange 3, one end of the flange having a slot therein and the inner walls of the rest of the flange having grooves therein so that a plate 4 can be slid into and out of the flanged part to cover and uncover the opening. This opening is substantially the same size as the picture taken by the camera. The plate is provided with a handle 5 so that it can be readily moved to open and closed position and one corner of the plate has an opening therein covered by the usual red transparent member 6 so that the exposure members on the roll can be seen. I provide a member B for rotating each roller 7 to which the ends of the backing which carries the film strip are connected. These members B are so formed that the film strip and its backing can be moved in either direction, for a purpose to be hereinafter described.

Each member B consists of the usual rotating part 8 having a spring plunger 9 passing therethrough, with a handle 10 connected with the outer end of the plunger and adapted to engage either a deep slot 11 in the member 8 or a shallow slot 12 in said member. When a part of the handle 10 is in the shallow slot, the wings 13 on the plunger will engage the notches in the end of the roller 7, so that when the handle 10 is turned, the roller will also be turned, but when a part of the handle 10 is in the deep slot, the wings are drawn out of the notches in the roller, though the end of the plunger still remains in engagement with the hole in the roller, so that the roller is supported for free rotary movement. Thus by drawing the plunger outwardly of one member B and pushing in the plunger of the other member B, the film strip and its backing can be moved in one direction by the rollers, and by reversing the positions of the members B, the film strip and its backing can be caused to move in an opposite direction.

The front end of the backing C is formed with a transparent part $c$ which acts as a ground glass when brought opposite the opening 2 and the slide 4 and the shutter are opened. Thus the camera can be focussed on the article by looking through the opening upon the transparent member, after which the shutter is closed and the slide 4 also closed. Then the film strip and its backing are moved to a position where the next film to be exposed is positioned to receive the light rays when the shutter is opened. If several pictures are to be taken with the camera in one position, this can be done without re-focussing the camera, but when the camera is to be re-focussed, then the film strip and its backing are turned back to bring the transparent part of the backing opposite the opening so that the focussing can be done. Then the shutter and opening are closed and the film strip and backing moved to bring the new part of the film into exposing position.

I provide means for indicating the number of exposures made or the number of the new section of the film to be exposed. Such means consists of a disk 14 having thereon the numbers of sections on the film strip, these numbers appearing at a window 15 formed in a closure part at one edge of the camera, as shown in Figure 1, the disk being provided with a knob 16 whereby it can be turned. Thus after an exposure has been made, the disk is turned to indicate the number of the exposure or of the next exposure so that the photographer cannot forget how far the film strip is to be turned back after the focussing has been done.

In order to prevent the ends of the backing strip from being detached from the rollers, I form each end of the strip with a pair of flaps 17 which are folded when the end of the strip is being passed through the slot in the roller, after which the flaps are unfolded, so that they will lock the end of the backing to the roller. Each of the guiding rolls 18 of the camera is formed with the enlarged ends 19 so that the sensitive face of the film strip is held out of contact with the rolls.

The backing is provided with a numeral or letter adjacent the transparent part, this character appearing through the window 6 when the transparent part is opposite the opening.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A film camera having an elongated opening in the rear wall of substantially the same size as the picture taken by the camera, opposed side and end flanges projecting outwardly from the rear wall and defining a slide receiving frame bounding said opening, one of said end walls having a slot, the remaining flanges having grooves, a slide received by said slot and grooves for normally closing said opening, a film carrying backing strip in the camera having a transparent portion serving as a ground glass when the transparent portion is arranged opposite said opening and with said slide opened, means whereby the backing strip can be adjusted, and said slide having a window adjacent one corner thereof.

JOSEPH BUHOLZER.